Nov. 14, 1933.　　　　A. COPONY　　　　1,934,841
DECKING DEVICE FOR VEHICLES
Filed May 18, 1931　　　2 Sheets-Sheet 1
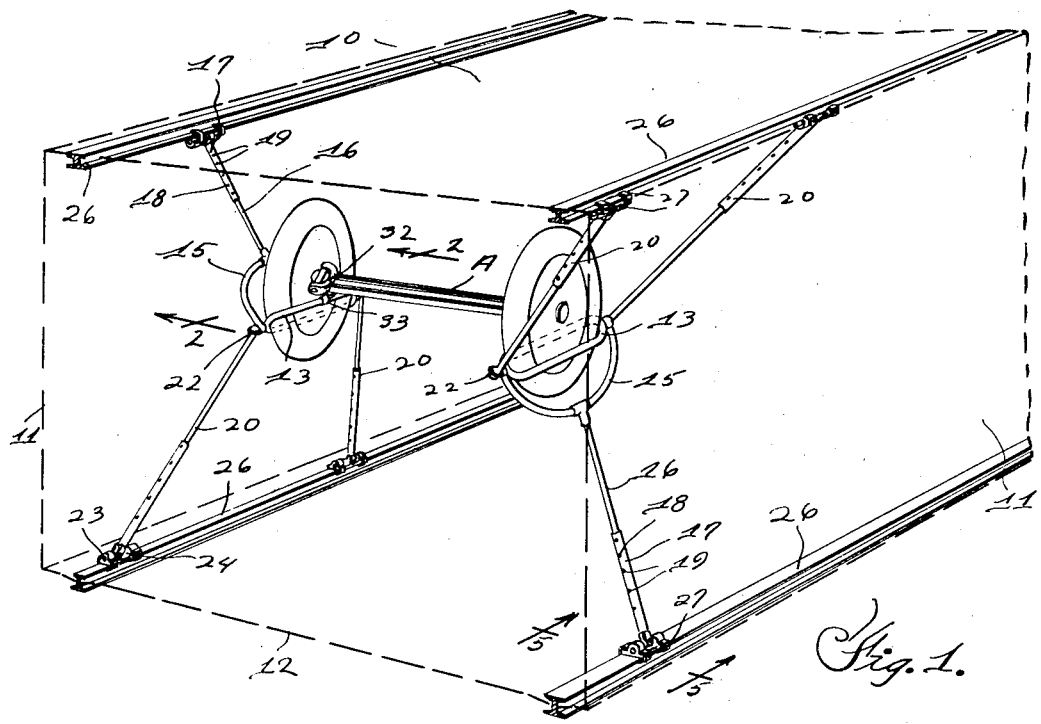
Fig. 1.
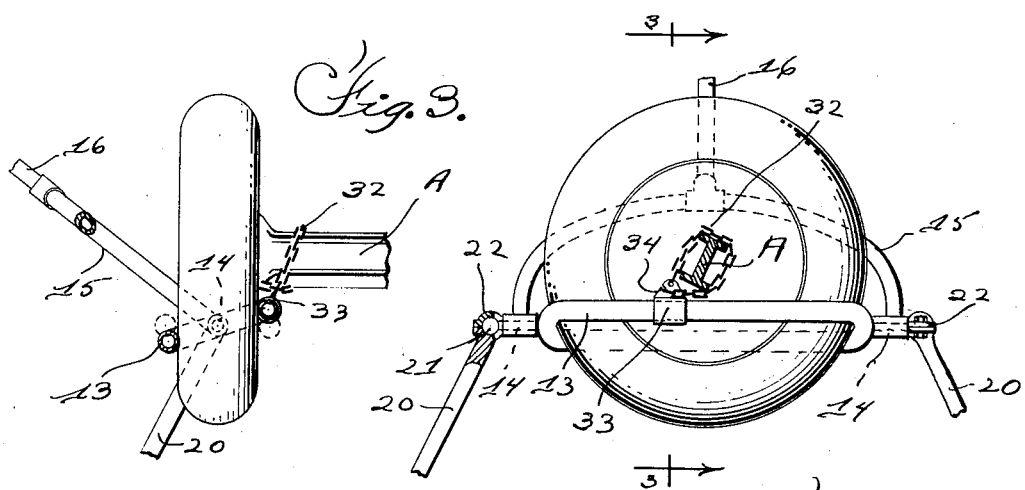
Fig. 3.　　　Fig. 2.
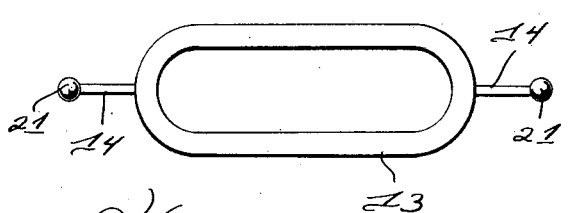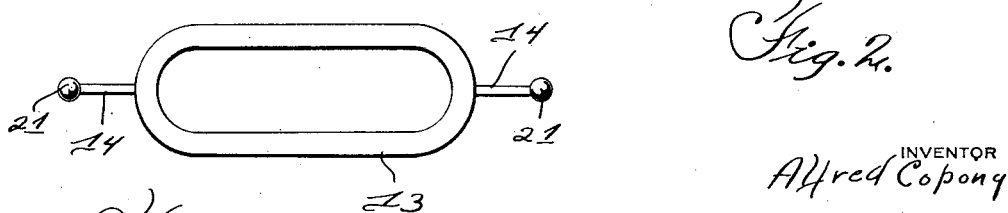
Fig. 4.
INVENTOR
Alfred Copony
BY
Whittemore Hulbert Whittemore Belknap
ATTORNEYS

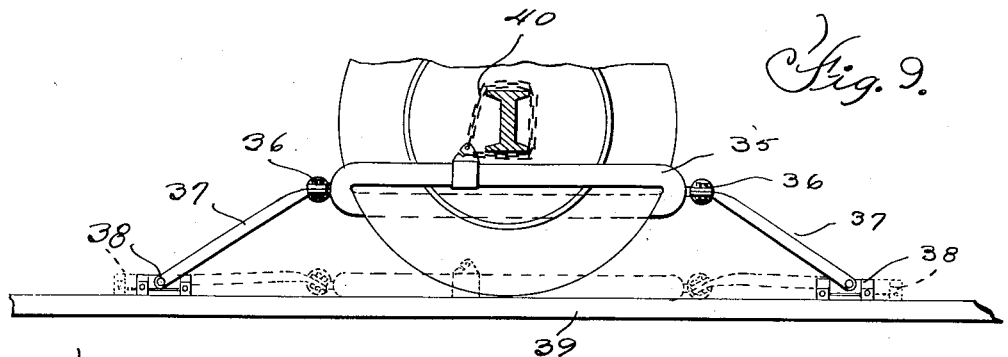
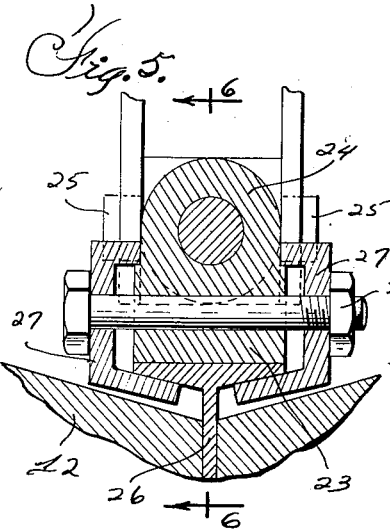
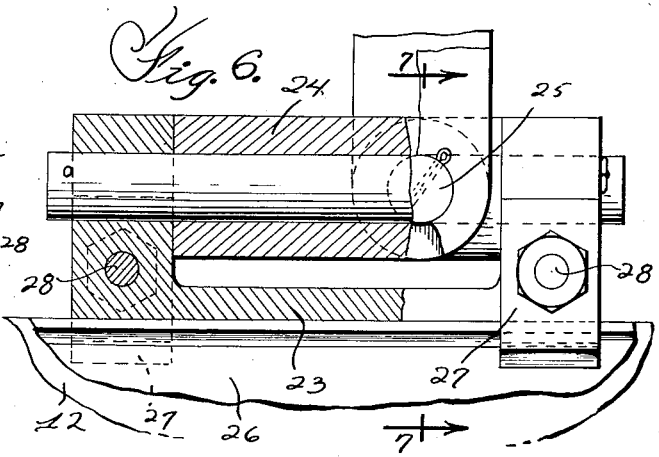
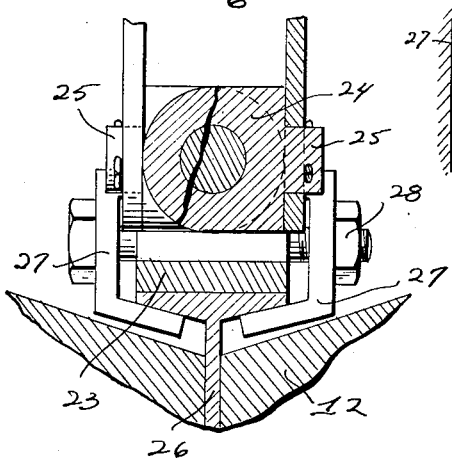
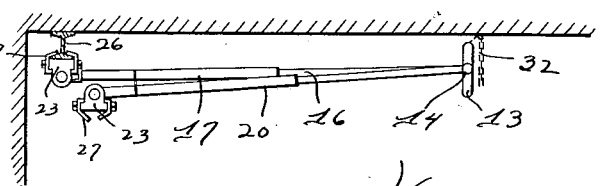
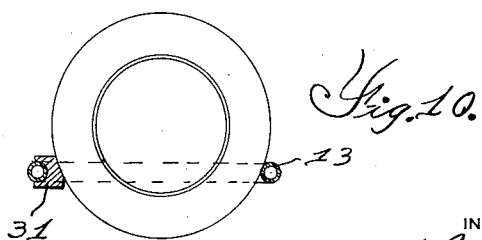

Patented Nov. 14, 1933

1,934,841

UNITED STATES PATENT OFFICE

1,934,841

DECKING DEVICE FOR VEHICLES

Alfred Copony, Mount Clemens, Mich., assignor to Copony Auto Loading Company, Detroit, Mich., a corporation of Michigan Application May 18, 1931. Serial No. 538,284

32 Claims. (Cl. 105—368)

This invention relates to automobile decking devices and more especially to vehicle decking devices adapted for use in freight cars and the like.

One of the primary objects of the invention is to provide simple and effective means whereby motor vehicles and the like may be held in freight cars, for instance, securely against movement in all directions.

Another object of the invention is to provide a decking device to which the vehicle wheels can be readily connected.

Other objects of the invention are to provide decking means of this nature which may be adjusted both longitudinally of the storage space and also vertically with respect thereto. The invention also contemplates a structure which is adapted to remain as a part of the freight car but can be folded out of position when not in use, the structure, nevertheless, permitting the decking means to be removed from the freight car if desired.

Several objects, advantages and novel details of the invention will be made more apparent as this description proceeds, especially when considered in connection with the accompanying drawings wherein Figure 1 is a perspective view of my improved vehicle decking means associated, for instance, with a freight car, two forms of supporting means being illustrated, respectively, at opposite sides of the vehicle;

Figure 2 is an enlarged fragmentary sectional elevational view taken substantially on the plane indicated by line 2—2 in Figure 1;

Figure 3 is a vertical sectional elevational view taken substantially on the plane indicated by line 3—3 in Figure 2;

Figure 4 is a plan view of the wheel engaging element or loop;

Figure 5 is an enlarged fragmentary sectional elevational view taken substantially on the plane indicated by line 5—5 in Figure 1;

Figure 6 is a detail sectional view taken substantially on the plane indicated by line 6—6 in Figure 5;

Figure 7 is a detail sectional view taken substantially on the plane indicated by line 7—7 in Figure 6;

Figure 8 is a sectional elevational view through a portion of the freight car showing one of the decking devices folded and supported in inoperative position;

Figure 9 is a sectional elevational view showing another slightly modified form of decking device, and Figure 10 is a sectional elevational view through one of the wheel engaging members showing an attachment for use when vehicles having wheels of smaller size are decked.

From Figure 1 it will be noted that there is diagrammatically illustrated a fragment of a freight car or the like having a top or roof structure 10, sides 11, and a floor 12. It is generally customary to half deck the vehicles, that is, to secure the axle at one end of a vehicle in a raised position, spaced from the floor, as is well known in this art.

Primarily my invention contemplates the use of wheel engaging elements 13, one adapted to engage each wheel, one of these wheel engaging elements being illustrated in plan view in Figure 4. These wheel engaging elements 13 are each loop-shaped as illustrated, being in plan view a substantially elongated oval or rectangle having rounded ends. The wheel engaging members may be made of solid bars or of tubular construction, preferably the latter.

Each of the wheel engaging elements or loops 13 is adapted to be supported in such a manner as to permit the same to be rocked about a substantially horizontally arranged axis.

For this purpose I provide either the type of supporting means illustrated at the left hand side of Figure 1, or the type of support illustrated at the right hand side of Figure 1, or any preferred or desired type of support which will permit a rocking of the wheel engaging loop about a longitudinal axis.

As shown in Figure 4, for instance, the loop engaging element is provided with trunnions in the form of stub-shafts or projections 14 at the opposite ends thereof and as shown at the left of Figure 1, the ends of a fork shaped member 15 are pivotally connected to these trunnions 14 by being journaled thereon. The fork-shaped member 15 is provided with a rod like extension 16 telescoping within a tubular member 17 which is secured, for instance, to the roof 10 of the freight car. The supporting element 16—17 is longitudinally extensible by reason of the telescopic connection between the members 16 and 17 and when adjusted to the proper length may be secured in place by inserting a pin 18 through any one of a plurality of apertures 19 in the sleeve 17 which register with openings (not shown) formed in the rod member 16.

Attached to the end of each trunnion member 14 is an extensible supporting member 20, the connection between these supporting members and the trunnions 14 being preferably a semi-universal connection so as to permit of angular disposition of the supports 20. In the embodiment of the invention illustrated, I have shown the trunnions 14 as being provided with semi-spherical or ball-shaped ends 21 with which sockets 22 carried by the ends of the supports 20 are engaged. In accordance with my invention I prefer to connect the ends of the supporting arms to the freight car roof and floor by means which permit of longitudinal adjustment and which also permit of the supporting arms being disconnected from the roof and floor when desired.

In Figures 5, 6 and 7, I have illustrated one form of anchoring means for the supporting arms which is commercially practical and obtains the desired results. In these figures it will be noted that each anchorage means comprises a foot or bracket 23 in which a member 24 is pivotally mounted for movement about a horizontal axis. This member 24 is provided with a pair of opposed trunnions 25 with which the bifurcated end of the support 20 is pivotally connected. This provides for a substantial universal movement between the support 20 and the member 23. Obviously the support may be either one of the upwardly or downwardly extending arms. Both the floor and roof of the car is formed with longitudinally extending I-beams 26 and the shoes or brackets 23 are adjustably secured thereto by means of clips 27 which are secured in place by clamping bolts 28 passed through the opposed clips and through the shoes 23. To longitudinally adjust the shoes 23 with respect to the I-beams 26, the bolts 28 will be loosened and when properly adjusted the shoes are secured in place by tightening the bolts as will be obvious.

Thus the anchorage means for each of the arms may be adjusted longitudinally of the car to the proper position and secured in place and when, as will be hereinafter explained, it is desired to fold the decking device upwardly to a point adjacent the roof of the freight car, this may be done by disconnecting the anchorage means at the floor whereupon the decking device can be swung to the position illustrated in Figure 8.

At the right hand side of Figure 1, the supporting means for the wheel engaging loop 13 is substantially the reverse of that illustrated at the left hand side of Figure 1. That is, the fork-shaped member 15 constitutes a portion of the downwardly extending support whereas the supporting members 20 extend upwardly and are connected to the roof of the freight car. This tends to indicate that the specific form of supporting means for the wheel engaging loop may be varied as found desirable or expedient.

In connecting the decking devices to the vehicles the wheels are inserted in the wheel engaging loops 13 as illustrated in Figures 1, 2 and 3. The longitudinal length of the opening of each wheel engaging loop will be sufficient to accommodate the largest standard size wheel and will be of sufficient width also for this purpose but will preferably be slightly wider to permit of a rocking of the loop for a purpose to be later referred to.

If vehicles are to be decked having wheels too small for the wheel engaging loops 13, these wheels may be accommodated by chuck blocks or inserts 31 as illustrated in Figure 10, associated with one or both ends of the loop to decrease the longitudinal length of the opening.

After a wheel has been inserted in one of the loops, the loop is rocked about its horizontal axis in a manner clearly shown in Figures 2 and 3. This decreases the width transversely of the opening through the loop and causes the longitudinal sides of the loop to bite the wheel with a clamping action which will rigidly secure the wheel to the wheel engaging loop. The wheel engaging element 13 is secured in this rocked position as, for instance, by means of a chain 32 which may have one end thereof secured to one longitudinal side of the loop as, for instance, by means of a bracket 33, the other end of the chain being passed around the axle of the vehicle and secured in a slot 34 in the bracket. Obviously, other means may be employed for securing the wheel engaging loop in its rocked position but the described means is a practical one.

By rocking the wheel engaging loop 13 the wheel is firmly engaged on opposite sides thereof and this prevents relative lateral movement of the wheel and consequently the vehicle. Longitudinal movement is prevented by the engagement of the wheel with the ends of the loop and relative vertical movement is prevented by the chain 32 which as described, is passed over the axle and thus acts to hold the vehicle wheel firmly down in engagement with the wheel engaging loop.

As will be noted from Figure 1, the position of the supporting arms provides for triangular bracing of the wheel engaging loops with respect to the vertical sides 11 of the freight car and the diverging relation of the pair of supporting members 20 effects a bracing longitudinally of the car.

As will be seen from Figure 9, my improved decking device may be employed as a hold-down device for vehicles which are supported with their wheels upon the floor or other support. In this figure the wheel engaging loop 35 has a substantially universal connection 36 at its ends with supporting arms 37 which are anchored as at 38 to the floor support 39. The anchorages 38 may be of substantially the same construction as illustrated in Figures 5 to 7 inclusive, previously referred to. In this form of construction the anchorage means 38 will be loosened to permit the loop 35 to be disposed upon the flooring 39 as suggested in dotted lines whereupon the vehicle may be driven over the hold-down device and the wheel position over the loop 35, whereupon the anchorage means 38 may be moved toward one another to thus raise the loop 35 into engagement with the wheel as shown in full lines whereupon the anchorages are fixed in place and the loop is rocked by means of the chain 39 in the same manner as heretofore explained. In this form of construction the wheel will rest upon the floor 39 or may be supported just slightly thereabove.

Obvious modifications will suggest themselves to those skilled in this art and to this end reservation is made to make such changes as may come within the purview of the accompanying claims.

What I claim as my invention is:

1. In a decking device, a wheel engaging member, means for pivotally supporting said member, and means for tilting said member to bite the wheel between spaced portions of said member and for holding said member in this position.

2. In a vehicle decking device for freight cars and the like, a wheel engaging member, means for pivotally supporting said member, and means for tilting said member to laterally grip the wheel and for holding said member in this position.

3. A decking device for vehicles including, a wheel supporting member having portions engaging the periphery of the wheel, and portions adapted to be moved into engagement with the sides of the wheels to grip the same.

4. A decking device for vehicles including, a wheel supporting member having portions engaging the periphery of the wheel, and portions adapted to be moved into engagement with the sides of the wheel by a rocking movement of said member.

5. A decking device for vehicles including, a rigid wheel supporting member having portions initially engaging the periphery of the wheel and portions adapted for engagement with the sides of the wheel upon a relative tilting movement of said member.

6. A decking device for vehicles including, a rigid wheel receiving member having opposed end portions initially engaging the periphery of the wheel, and spaced opposed side portions adapted for biting engagement with the sides of the wheel upon a relative tilting movement of said member.

7. In a decking device for vehicles, a wheel engaging loop, means for supporting said loop to permit rocking thereof, and means for securing said loop in engagement with the wheel of the vehicle by fixing the same in rocked position.

8. In a decking device for vehicles, a wheel engaging loop adapted to encircle the wheel and engage the periphery of the latter, means for pivotally supporting said loop, and means for securing said loop in engagement with the wheel of the vehicle by rocking the same about its pivots and fixing the same in rocked position.

9. In a decking device for vehicles, a wheel encircling member, means for rockably supporting said member, and means for securing said member in rocked position for rigid engagement with the wheel.

10. A decking device for vehicles including, a loop-shaped member adapted to support a vehicle wheel by engagement with the periphery thereof, means for rockably supporting said member, and means for rocking and securing said member in this position to effect an engagement of the same with the sides of the wheel.

11. A decking device for vehicles including, a loop-shaped member adapted to support a vehicle wheel by engagement with the periphery thereof, means for rockably supporting said member, and means for rocking and securing said member in this position to effect an engagement of the same with the sides of the wheel, including a flexible member connected to said loop-shaped member and passed around the axle of the vehicle, said member acting to hold said wheel against relative vertical displacement.

12. In a decking device of the class described, a wheel engaging member, supporting arms pivotally connected to said member, means for adjustably connecting the ends of said arms to a fixed support, and means for tilting said wheel engaging member to cause the same to engage the sides of the wheel and for holding said wheel engaging member in this position.

13. In a vehicle decking device for freight cars and the like, a wheel encircling member, upwardly and downwardly extending supporting arms pivotally connected to said wheel engaging member, means for adjustably securing said supporting arms respectively to the top and bottom of the freight car, and means for tilting said wheel engaging member about its supports and for securing said member in this position, for the purpose set forth.

14. In a vehicle decking device for freight cars and the like, a wheel engaging member, means for pivotally supporting said wheel engaging member including supporting arms pivotally connected thereto, longitudinally extending guideways secured to the top and bottom of the freight car, anchorage means mounted in said guideways, means for pivotally connecting the ends of said supporting arms to said anchorage means, and means for disengaging the anchorage means from the lower guideways to permit a folding of said decking device to a position adjacent the top of the freight car.

15. The combination with a freight car or the like, of a cradle for engaging and supporting the tire of a vehicle wheel in the car in an elevated position, and thrust members movably connected to the cradle, extending downwardly in diverging relation and having their lower ends connected to a lower part of the car, one of the last mentioned connections being adjustable relative to the car to permit moving such lower ends of the members with respect to each other, thereby enabling changing the angle of divergence between such members, and the elevation of the cradle.

16. The combination with a freight car or the like, of a vehicle in the car, means for engaging and supporting the tire on a wheel of the vehicle, in an elevated position, thrust members movably connected at their upper ends to said means and extending downwardly in diverging relation, means for pivotally connecting the lower end of each thrust member to a lower part of the car, and means for adjusting each pivotal point longitudinally of the car.

17. A device for supporting a vehicle in elevated position in a freight car or the like, comprising a cradle adapted to embrace a lower portion of a tire on the vehicle, and cradle supporting rods pivotally connected to the cradle for pivotal movement lengthwise of the car, and means for adjustably connecting the opposite ends of the supporting rods to a part of the car for supporting the cradle in elevated position.

18. The combination with a freight car or the like, of tire embracing means for supporting a part of a vehicle in elevated position in the car, rigid members movably connected at one end to said means and extending in substantially vertical planes and in diverging relation, and means connecting the other ends of the members to the car and at least one end adjustably thereto so that the angle of divergence may be changed, and the elevation of the supporting means thus varied.

19. The combination with a freight car or the like, of a device for engaging and supporting a vehicle wheel in the car, in elevated position, a rigid member connected to the device and to a lower part of the car, and means connecting such device to the wheel axle.

20. The combination with a freight car or the like, of a device for engaging the lower part of a vehicle wheel and supporting it in the car in elevated position, a rigid member connected to the device and to a part of the car, and means connecting the device to the wheel axle intermediate the wheels thereon.

21. The combination with a freight car, of longitudinally adjustable thrust members pivotally connected to a lower part of the car, and extending upwardly therefrom in converging relation to one another, means on said members for supporting a vehicle, and means connected to an upper part of the car and operatively connected to the vehicle for partially suspending the vehicle.

22. The combination with a freight car, of a pair of downwardly diverging thrust means adjustably connected to a lower part of the car for supporting a vehicle in a variable elevated position, and suspension means connected to an upper part of the car and operatively connected to the vehicle, for modifying the thrust load by suspension of the vehicle.

23. The combination with a freight car or the like, of thrust members diverging downwardly, tire engaging means movably connecting the upper ends of the thrust members, and for supporting a part of the vehicle in the car in elevated position, means for movably connecting the lower ends of the thrust members to lower parts of the car, and means for varying the relative positions of said last connections longitudinally of the car, thereby to vary the angle of divergence between such members and the elevation of the vehicle supporting means.

24. The combination with a freight car or the like, tire engaging means for supporting a part of a vehicle in the car, downwardly diverging thrust rods pivotally connected to a lower part of the car and to the first mentioned means for supporting the tire and a wheel of the vehicle in elevated position, and means operatively connected to such engaging means and extending laterally for connection with the car for additionally supporting the vehicle.

25. The combination with a freight car or the like, of thrust rods diverging downwardly toward a side wall of the car, means for adjustably connecting the lower ends of the rods to a lower part of the car so that the longitudinal space between such lower ends may be varied and hence the angle of divergence varied, and tire engaging means pivotally connecting the upper ends of the rods and adapted to support a part of the vehicle in the car in elevated position.

26. The combination with a freight car or the like, of thrust rods diverging downwardly toward a side wall of the car, means for adjustably connecting the lower ends of the rods to a lower part of the car so that the longitudinal space between such lower ends may be varied and hence the angle of divergence varied, tire engaging means pivotally connecting the upper ends of the rods and adapted to support a part of the vehicle in the car in elevated position, and means operatively connected to the upper ends of the rods and to an upper part of the car for additionally supporting the vehicle.

27. The combination with a freight car or the like, of thrust rods extending upwardly and inwardly, in converging relation, from a lower part of the car, means adjustably connecting the lower ends of the rods to a lower part of the car so that they may be spaced variable distances longitudinally of the car, and hence the angle of convergence of the rods varied, tire engaging means pivotally connecting the upper ends of the rods and adapted to support a part of a vehicle in elevated position, and means operatively connected to the upper ends of the rods, and extending upwardly and toward a side wall of the car and being connected to an upper part of the car, for additionally supporting the vehicle in position.

28. The combination with a freight car or the like, of a pair of downwardly diverging thrust members pivoted to a lower part of the car, means connected to upper parts of said members for supporting a part of a vehicle in elevated position, and connections operatively connected to the vehicle and to upper parts of the car for additionally supporting the vehicle.

29. The combination with a freight car or the like, of a pair of thrust rods at each side of the car and having their lower ends adjustably connected to lower parts of the car, said rods of each pair converging upwardly and being inclined toward the center of the car, vehicle supporting means at the upper ends of the rods, and means operatively connecting the vehicle to upper, and opposite sides of the car.

30. The combination with a freight car, of a pair of thrust rods at each side of the car and having their lower ends pivoted to lower parts of the car, said rods of each pair converging upwardly and being inclined toward the center of the car, vehicle supporting means at the upper ends of the rods, and means operatively connecting the vehicle to upper and opposite sides of the car.

31. The combination with a freight car or the like, of a tire engaging device for supporting a part of a vehicle in the car in elevated position, rigid members connected at one end to the device and swingable in substantially vertical planes, means for connecting the lower ends of said members to lower parts of the car in such manner that such ends may be spaced variable distances, and a member connecting said device to an upper part of the car.

32. The combination with a freight car or the like, of a device for engaging and supporting a vehicle wheel in the car, in elevated position, a rigid member connected to the device and to a lower part of the car, and means connecting such device to the wheel axle and to an upper part of the car.

ALFRED COPONY.